(12) United States Patent
Min

(10) Patent No.: US 6,847,407 B2
(45) Date of Patent: Jan. 25, 2005

(54) DIGITAL TELEVISION RECEIVER

(75) Inventor: Ki Tae Min, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 548 days.

(21) Appl. No.: 10/033,978

(22) Filed: Jan. 3, 2002

(65) Prior Publication Data
US 2002/0089605 A1 Jul. 11, 2002

(30) Foreign Application Priority Data
Jan. 5, 2001 (KR) .......................................... 2001-659

(51) Int. Cl.$^7$ ............................................... H04N 5/45
(52) U.S. Cl. ...................... 348/565; 348/554; 348/731
(58) Field of Search ................................ 348/565, 553, 348/563, 564, 554, 555, 725, 726, 731; 375/265, 321, 345, 324, 344; H04N 5/45, 5/46, 5/50, 5/445

(56) References Cited
U.S. PATENT DOCUMENTS
6,353,463 B1 * 3/2002 Seo ............................ 348/731
6,603,517 B1 * 8/2003 Shen et al. .................. 348/565
6,757,029 B2 * 6/2004 Kurihara ..................... 348/731

\* cited by examiner

Primary Examiner—Sherrie Hsia
(74) Attorney, Agent, or Firm—Fleshner & Kim, LLP

(57) ABSTRACT

A digital television receiver that can perform analog/digital and main/sub picture functions only using an analog tuner and an analog/digital-combined tuner is disclosed. The digital television receiver includes a control section for generating and outputting control signals according to a user's command for selecting a channel and a main/sub picture, an analog tuning section for selecting an RF signal of an analog channel selected by the user among RF signals received through an antenna under the control of the control section, and converting the selected RF signal into an IF signal, and an analog/digital (A/D)-combined tuning section for selecting an RF signal of an analog or digital channel selected by the user among the RF signals received through the antenna under the control of the control section. The main and sub pictures can be constructed using only two tuners irrespective of the analog/digital channels, and thus the manufacturing cost can be reduced with the improvement of the product competitiveness.

19 Claims, 4 Drawing Sheets

DIGITAL TELEVISION RECEIVER

BACKGROUND OF THE INVENTION

1. Field of the Invention

The present invention relates generally to a television receiver, and more particularly, to a digital television receiver (TV) that can receive both an analog video signal and a digital video signal.

2. Background of the Related Art

Up to now, diverse types of analog TVs from small-sized models of 14 inches to projection TVs of over 60 inches have been presented to consumers.

However, such analog-type TVs have exposed various kinds of problems as they become large-sized and have high-grade functions.

First, in case of viewing the existing analog-type broadcasts such as an NTSC, PAL, or SECAM type through a large-sized TV, it can be known from experience that the picture quality deteriorates.

Second, the number of serviceable broadcasting channels in a channel range of both a very high frequency and an ultra high frequency, which are currently allocated to the TV broadcasts, is limited to about 80, and the number of actually useable ground wave channels is only a half thereof due to the interference among adjacent channels.

Third, the analog-type TV has limitations of a unidirectional medium.

Specifically, the existing TV has only the function of a receiving medium, but from now on, it requires the function of a bidirectional terminal as the demand for the bidirectional function is tremendously increasing with the appearance of personal computers, Internet and so on.

Last, the market for analog TVs is at its peak of congestion.

In other words, since over two TVs have now found for a household in this country, no more demand therefor can be expected.

As a result, digital TVs have appeared as a scheme for solving the above problems in the analog TV market. The digital TV provides a clear picture quality over twice as high as that of the analog TV by greatly improving the picture quality of the analog TV. Also, since no interference exists among the adjacent channels, all the channel regions that could not be used in the existing analog TV can be used.

Also, according to the program service information protocol (PSIP) that is the standard, which is related to broadcasting additional information for providing detailed information on broadcasting programs, among the Advanced Television Service Committee (ATSC) that is the United States digital TV standards proposed in November 1997, one high definition (HD) digital broadcasting program or four standard definition (SD) digital broadcasting programs can be transmitted for a physical channel of 6 MHz, and thus the digital TV has the advantage in that it can provide several hundreds of diverse services. Also, since the digital TV is bidirectional and provides services such as Internet services, home shopping, home banking, etc., it has a great possibility that the analog channels are replaced by the digital channels sooner or later, and thus the tremendous demand for the digital TVs is expected.

However, in order to change the current analog ground wave broadcasting system to the digital ground wave broadcasting system, all the broadcasting equipment and TVs should be changed, and this requires a lot of time. Thus, the analog ground wave broadcasting system and the digital ground wave broadcasting system are in coexistence for a given period of time, and the digital TVs combined with the analog type, which can receive both the analog ground waves and the digital ground waves, are commercialized until the digital broadcasting system is completely established.

The conventional digital TV combined with the analog type, as shown in FIG. 1, includes a first NTSC tuner 12 and a second NTSC tuner 13 for selecting broadcasting signals of specified analog channels, an ATSC tuner 14 for selecting broadcasting signals of specified digital channels, an RF switch 11 for being connected to one among the first NTSC tuner 12, the second NTSC tuner 13, and the ATSC tuner 14 according to a user's selection of a channel or a main/sub picture, and receiving an RF signal of the corresponding channel through an antenna, an audio processing section for processing an audio signal of the broadcasting signal selected from the first NTSC tuner 12 or the second NTSC tuner 13, and outputting the processed audio signal to a speaker 21, a video processing section 16 for processing the broadcasting signal selected from the first NTSC tuner 12 or the second NTSC tuner 13, and outputting the processed video signal to a display section 22 such as a CRT, a SAW filter 17 for filtering a desired frequency band of the broadcasting signal selected from the ATSC tuner 14, an IF demodulating section 18 for demodulating video and audio IF signals from an output of the SAW filter 17, a VSB decoder 19 for decoding an output of the IF demodulating section 18, a mixer 20 for mixing an output of the video processing section 16 and an output of the VSB decoder 19, and the display section 22 for displaying an output of the mixer 20 on a display screen.

At this time, the first and second NTSC tuners 12 and 13 are analog tuners of the NTSC type currently adopted in this country among the analog broadcasting types of NTSC, PAL, SECAM, etc. The ATSC tuner is an ATSC digital broadcasting type filter adopted in this country.

The operation of the conventional digital TV combined with the analog type as constructed above will be explained.

For example, if a user selects a main/sub picture in a state that images of the main and sub pictures are all analog images, a channel broadcasting signal corresponding to the main picture is selected by the first NTSC tuner 12, and a channel broadcasting signal corresponding to the sub picture is selected by the second NTSC tuner 13 under the control of a microcomputer (not illustrated) that has recognized the user's command.

The main-picture and sub-picture broadcasting signals selected by the first and second NTSC tuners 12 and 13 are then processed by the video processing section 16, synthesized, and displayed through the display section 22.

Meanwhile, if the user selects a digital broadcasting channel, the corresponding channel broadcasting signal is selected by the ATSC tuner 14, and then processed through the SAW filter 17, the IF demodulating section 18, and the VSB decoder 19.

At this time, if the user selects the analog video signal for the main picture or the sub picture, the main-picture or sub-picture analog video signal outputted through the first or second tuner 12 or 13 and the video processing section 16 is outputted to the mixer 20, and mixed with a digital image outputted from the VSB decoder 19 in the mixer 20. The mixed image is then displayed through the display section 22.

Accordingly, if the user selects the analog channels for the main and sub pictures, two analog tuners are required for implementing the corresponding images. Also, in case of the digital channel, a separate digital tuner is required. Thus, three tuners are required in total.

As a result, the conventional digital TV that has the main/sub picture function requires three tuners including two analog tuners and one digital tuner, and this causes the manufacturing cost of the TV to be increased.

SUMMARY OF THE INVENTION

Accordingly, the present invention is directed to a digital television receiver that substantially obviates one or more problems due to limitations and disadvantages of the related art.

An object of the present invention is to provide a digital television receiver that can perform all the analog/digital and main/sub picture functions only using one analog tuner and one analog/digital-combined tuner.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television receiver includes a control section for generating and outputting control signals according to a user's command for selecting a channel and a main/sub picture, an analog tuning section for selecting an RF signal of an analog channel selected by the user among RF signals received through an antenna under the control of the control section, and converting the selected RF signal into an IF signal, an analog/digital (A/D)-combined tuning section for selecting an RF signal of an analog or digital channel selected by the user among the RF signals received through the antenna under the control of the control section, a first analog video processing section for processing the IF signal of the analog channel selected by the analog tuning section in accordance with the main or sub picture selected by the user, a second analog video processing section for processing the IF signal of the analog channel selected by the A/D-combined tuning section in accordance with the main or sub picture selected by the user, a digital video processing section for processing the IF signal of the digital channel selected by the A/D-combined tuning section in accordance with the main or sub picture selected by the user, and an IF switching section for being switched under the control of the control section, and selectively outputting the IF signal outputted from the A/D-combined tuning section to either the second analog video processing section or the digital video processing section.

The second analog video processing section includes an analog SAW filter for filtering a desired analog channel band from the IF signal outputted through the IF switching section, an analog IF demodulating section for demodulating the IF signal outputted from the analog SAW filter, and separating the demodulated IF signal into video and audio signals, and a video processing section for processing the video signal in accordance with the main or sub picture selected by the user, and synthesizing the processed video signal with an output of the first analog video processing section to output a synthesized video signal.

The digital video processing section includes a digital SAW filter for filtering a desired digital channel band from the IF signal outputted through the IF switching section, a digital IF demodulating section for demodulating the IF signal outputted from the digital SAW filter, and outputting a demodulated signal in the form of a bit stream, and a digital decoder for restoring the original video signal by decoding the bit stream in a reverse order to compression.

In another aspect of the present invention, a digital television receiver includes a control section for generating and outputting control signals according to a user's command for selecting a channel and a main/sub picture, an analog tuning section for selecting an RF signal of an analog channel selected by the user among RF signals received through an antenna under the control of the control section, and converting the selected RF signal into an IF signal, an analog/digital (A/D)-combined tuning section for selecting an RF signal of an analog or digital channel selected by the user among the RF signals received through the antenna under the control of the control section, a first analog video processing section for processing the IF signal of the analog channel selected by the analog tuning section in accordance with the main or sub picture selected by the user, a second analog video processing section for processing the IF signal of the analog channel selected by the A/D-combined tuning section in accordance with the main or sub picture selected by the user, a digital video processing section for processing the IF signal of the digital channel selected by the A/D-combined tuning section in accordance with the main or sub picture selected by the user, an IF switching section for being switched under the control of the control section, and selectively outputting the IF signal outputted from the A/D-combined tuning section to either the second analog video processing section or the digital video processing section, an AGC switching section for detecting respective gains from the outputs of the second analog video processing section and the digital video processing section, being switched under the control of the control section, and controlling a gain of the signal selected by the A/D-combined tuning section, and a mixer for mixing the outputs of the first and second analog video processing sections and the output of the digital video processing section, and outputting a mixed signal for display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
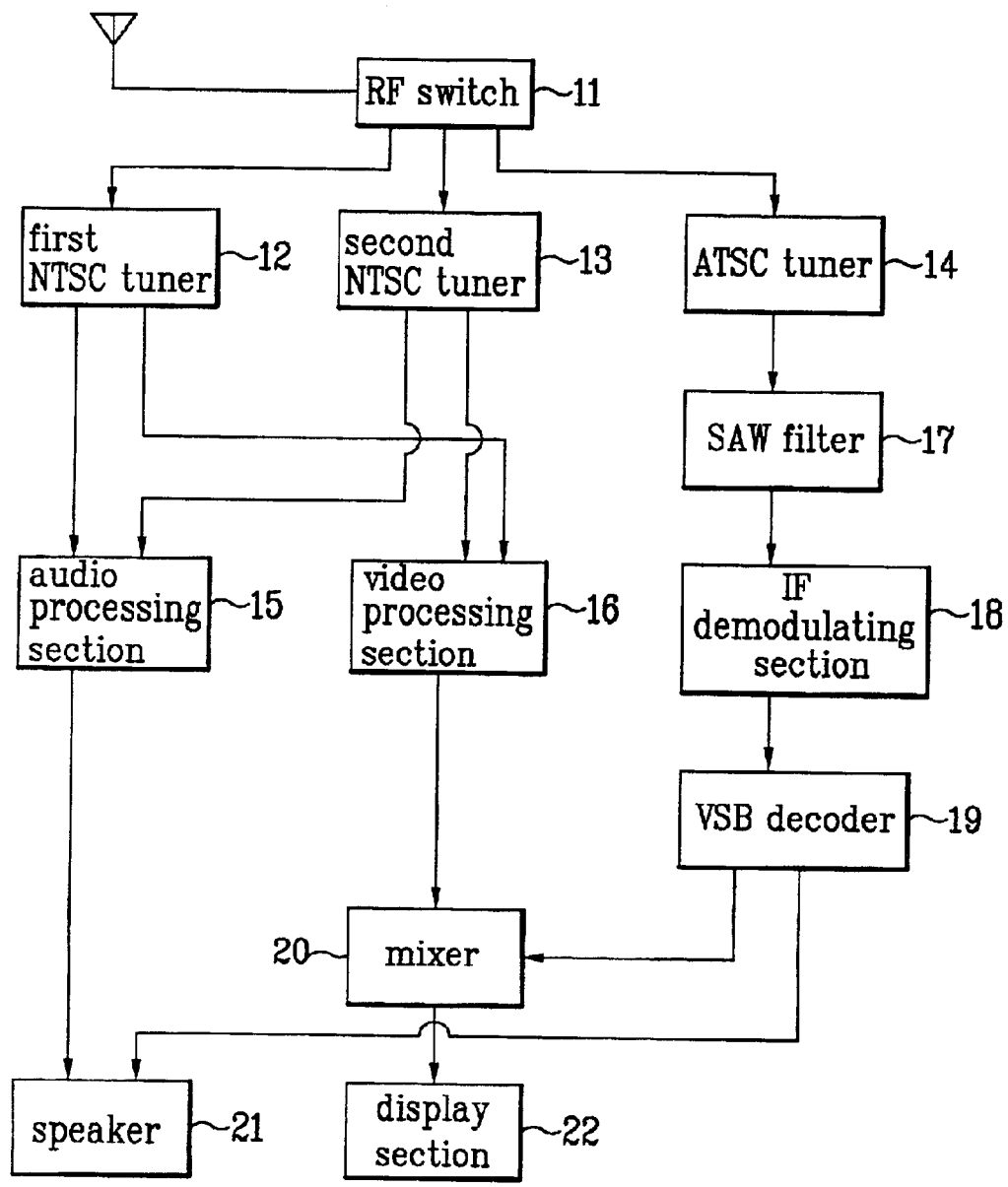
FIG. 1 is a block diagram illustrating the construction of the conventional digital television receiver.
Figure 2:
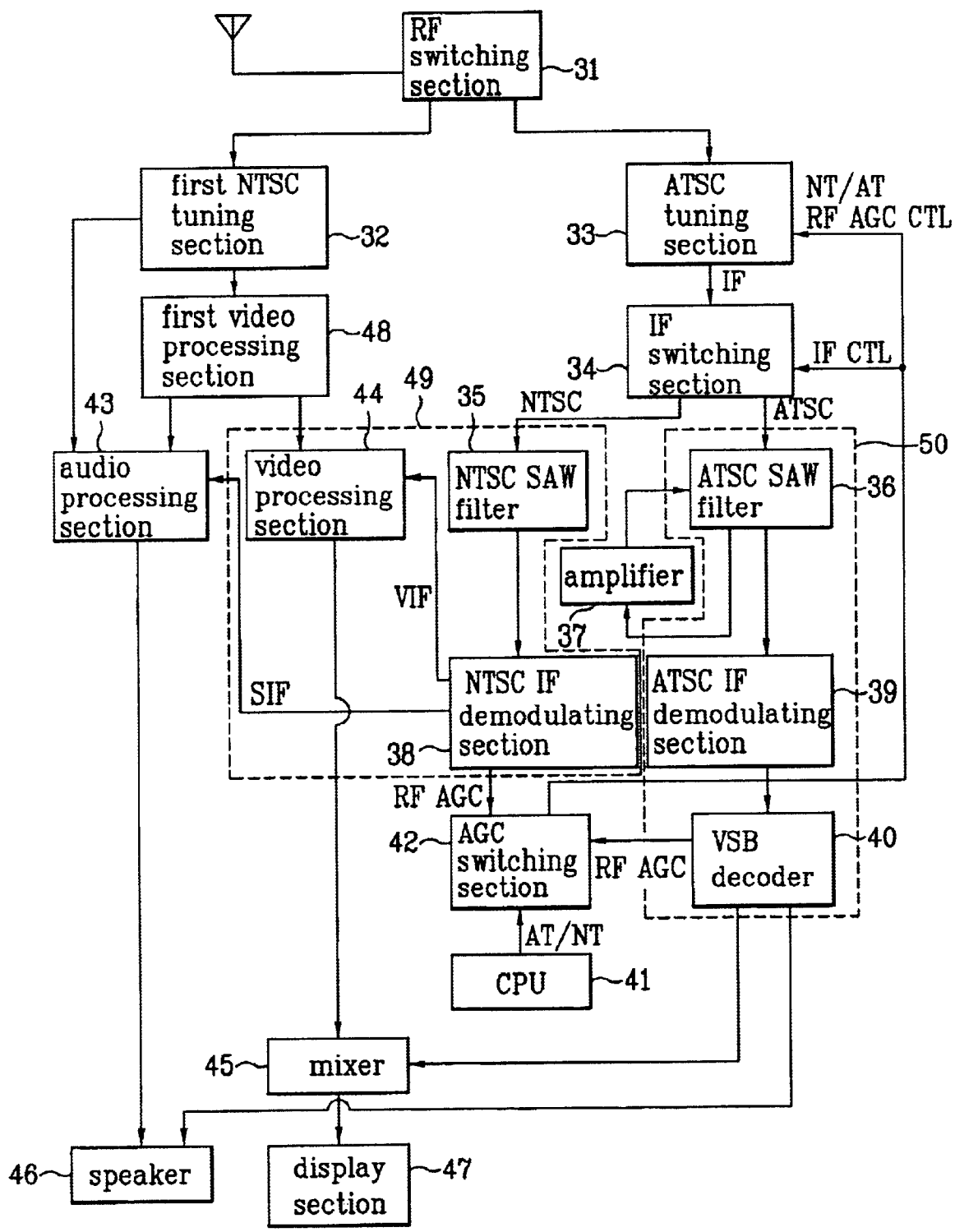
FIG. 2 is a block diagram illustrating the construction of a digital television receiver according to the present invention.

FIG. 2 is block diagram illustrating the construction of a digital television receiver according to the present invention.

Referring to FIG. 2, the digital television receiver (TV) according to the present invention includes a CPU 41 that is a control section for generating and outputting control signals according to a user's selection of a channel and a main/sub picture, an RF switching section 31 for being switched under the control of the CPU 41, and selecting and outputting to a specified tuner an RF signal received through an antenna, an NTSC tuning section 32 for tuning an NTSC broadcasting signal of a channel selected by the user among RF signals outputted through the RF switching section 31, demodulating the tuned signal into an intermediate frequency (IF) signal, and then separating the IF signal into a video IF (VIF) signal and a audio IF (SIF) signal, an ATSC tuning section 33 for tuning the NTSC broadcasting signal or an ATSC broadcasting signal of a channel selected by the user among the RF signals received through the RF switching section 31, and demodulating the tuned signal into an IF signal, an IF switching section 34 for selecting and outputting the NTSC IF signal or the ATSC IF signal outputted from the ATSC tuning section 33 under the control of the CPU 41, an NTSC surface acoustic wave (SAW) filter 35 for filtering a desired analog channel band from the NTSC IF signal selected and outputted through the IF switching section 34, an ATSC SAW filter 36 for filtering a desired digital channel band from the ATSC IF signal selected and outputted through the IF switching section 34, an amplifier 37 for amplifying an output of the ATSC SAW filter 36, and feeding an amplified signal back to the ATSC SAW filter 36, an NTSC IF demodulating section 38 for demodulating the NTSC IF signal outputted from the NTSC SAW filter 35, and separating a demodulated signal into the video IF signal (VIF) and the audio IF signal (SIF), an ATSC IF demodulating section 39 for converting the ATSC IF signal outputted from the ATSC SAW filter 36 into a bit stream, a VSB decoder 40 for restoring the original video signal by decoding an output of the ATSC IF demodulating section 38 in a reverse order to compression, an AGC switching section 42 for generating NTSC/ATSC RF gain control signals NT/AT RF AGC CTL and an IF switching signal IF CTL in accordance with an ATSC/NTSC discrimination signal outputted from the CPU 41 and RF AGC control signals detected from the NTSC IF demodulating section 38 and the VSB decoder 40, controlling a gain of the NTSC or ATSC video signal tuned by the ATSC tuning section 33, and controlling switching of the IF switching section 34, an audio processing section 43 for processing the analog audio signal outputted from the NTSC tuning section 32 or the NTSC IF demodulating section 38, and outputting the processed audio signal to a speaker 46, a video processing section 44 for processing the analog video signals outputted from the NTSC tuning section 32 and the NTSC IF demodulating section 38 in accordance with the main or sub picture selected by the user, a mixer 45 for mixing the analog video signal outputted from the video processing section 44 with the digital video signal outputted from the VSB decoder 40, and a display section 47 for displaying an output of the mixer on a display screen.

Figure 2A:
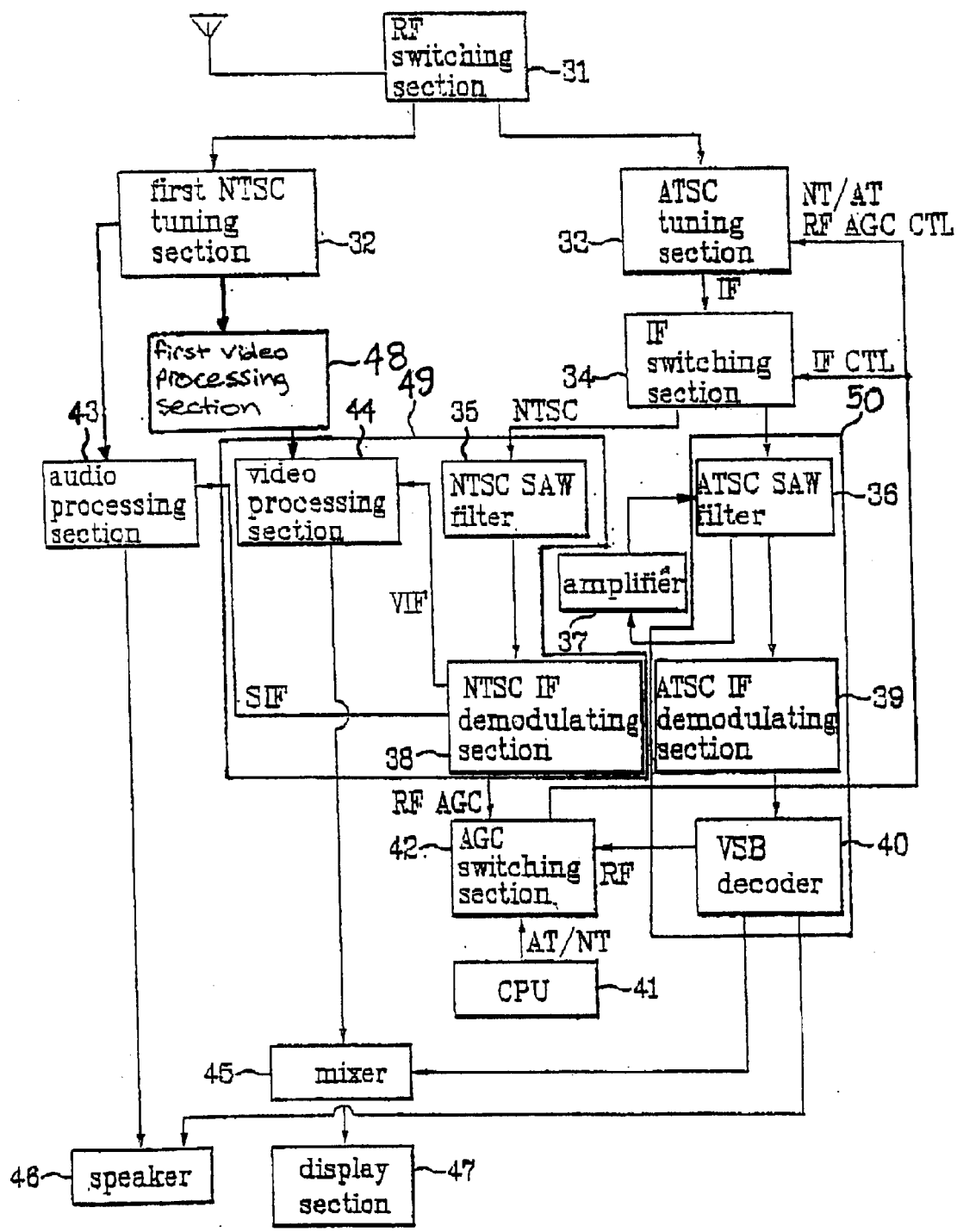
FIG. 2A is a block diagram illustrating the construction of a digital television receiver according to the present invention.

As shown in FIG. 2A, the digital television receiver according to one embodiment includes a CPU 41 that is a control section for generating and outputting control signals according to a user's command for selecting a channel and a main/sub picture, an analog tuning section 32 for selecting an RF signal of an analog channel selected by the user among RF signals received through an antenna under the control of the Cpu 41, and converting the selected RF signal into an IF signal, an analog/digital (A/D)-combined tuning section 33 for selecting an RF signal of an analog or digital channel selected by the user among the RF signals received through the antenna under the control of the CPU 41, a first analog video processing section 48 for processing the IF signal of the analog channel selected by the analog tuning section 32, a second analog video processing section 49 for processing the IF signal of the analog channel selected by the A/D-combined tuning section 33 in accordance with the main or sub picture selected by the user, a digital video processing section 50 for processing the IF signal of the digital channel selected by the A/D-combined tuning section 33 in accordance with the main or sub picture selected by the user, and an IF switching section 34 for being switched under the control of the CPU 41, and selectively outputting the IF signal outputted from the A/D-combined tuning section 33 to either the second analog video processing section 49 or the digital video processing section 50.

The second analog video processing section 49 may include an analog SAW filter 35 for filtering a desired analog channel band from the IF signal outputted through the IF switching section 34, an analog IF demodulating section 38 for demodulating the IF signal outputted from the analog SAW filter 35, and separating the demodulated IF signal into video and audio signals, and a video processing section 44 for processing the video signal in accordance with the main or sub picture selected by the user, and synthesizing the processed video signal with an output of the first analog video processing section 48 to output a synthesized video signal.

The digital video processing section 50 may include a digital SAW filter 36 for filtering a desired digital channel band from the IF signal outputted through the IF switching section 34, a digital IF demodulating section 39 for demodulating the IF signal outputted from the digital SAW filter, and outputting a demodulated signal in the form of a bit stream, and a digital decoder 40 for restoring the original video signal by decoding the bit stream in a reverse order to compression.

Figure 3:
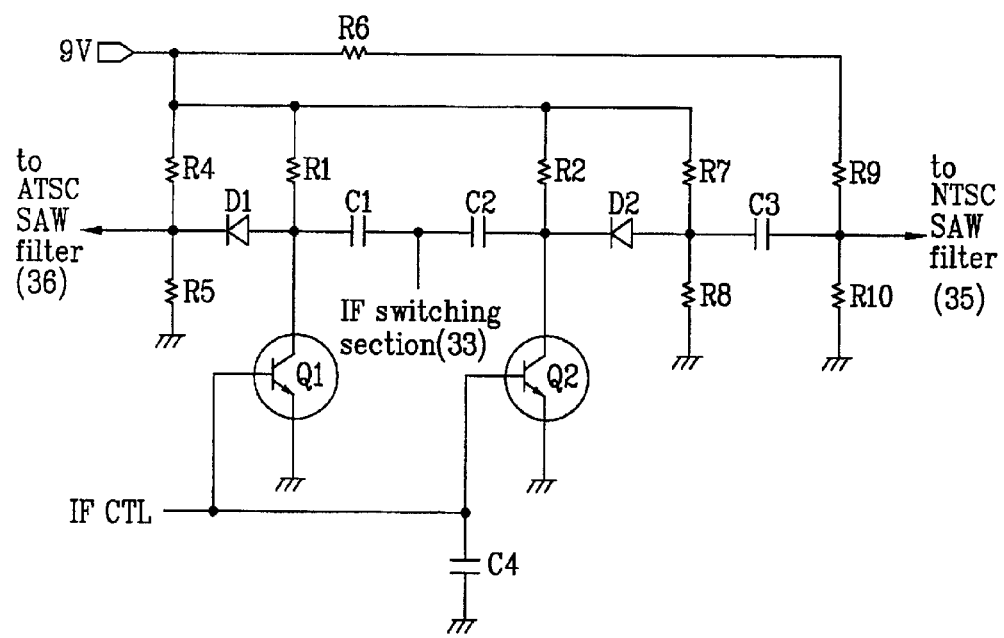
FIG. 3 is a detailed circuit diagram of an IF switching section of FIG. 2.

Referring to FIG. 3, the IF switching section 34 may have any construction that can select the NTSC IF signal or the ATSC IF signal under the control of the CPU 41. For example, the IF switching section 34 may be constructed using first and second transistors and first and second diodes as shown in FIG. 3.

In FIG. 3, the first and second transistors Q1 and Q2 have collectors connected together, emitters grounded, and bases connected in common to the CPU 41. The first and second transistors Q1 and Q2 are simultaneously turned on/off according to a logic signal outputted from the CPU 41. At this time, the IF signal outputted from the ATSC tuning section 33 is inputted to the collectors of the first and second transistors Q1 and Q2. The first diode D1 has an anode connected to the collector of the first transistor Q1 and a cathode connected to the ATSC SAW filter 36. If the first transistor Q1 is turned off, the first diode D1 is turned on, and outputs the IF signal outputted from the ATSC tuning section 33 to the digital SAW filter 36. The second diode D2 has a cathode connected to the collector of the second transistor Q2 and an anode connected to the NTSC SAW filter 35. If the second transistor Q2 is turned on, the second diode D2 is turned on, and outputs the IF signal outputted from the ATSC tuning section 33 to the NTSC SAW filter 35.

Here, the IF switching section 34 can be applied more widely and diversely, and is not limited to that of the above-described example.

Also, in FIG. 2, the NTSC signal is presented as an example of the analog broadcasting signal, and the ATSC signal is presented as an example of the digital broadcasting signal.

The operation of the digital TV as constructed above according to the present invention will be explained.

The RF switching section 31 is switched under the control of the CPU 41, and simultaneously or selectively distributes the RF signal received through the antenna to the NTSC tuning section 32 and the ATSC tuning section 33. Here, the NTSC tuning section is an analog tuner that can receive and select only the RF signal of the analog channel, and the ATSC tuning section 33 is an A/D-combined tuner that can receive both the RF signals of the analog channel and the digital channel.

The CPU 41 is the control section which controls the switching operation of the RF switching section 31, the IF switching section 34, and the AGC switching section 42 according to the user's command. The CPU 41 also controls the selection of the NTSC tuning section 32 and the ATSC tuning section 33 and the gain of the selected RF signal.

The user may select the main picture or both the main and sub pictures. At this time, in case of selecting both the main and sub pictures, they may be the analog channels, or may be the analog channel and the digital channel, respectively. In case of selecting only the main picture, it may be the analog channel or the digital channel.

Here, the main/sub picture function includes both a picture-in-picture (PIP) function and a twin-picture function. The PIP function constructs a dual picture composed of a main picture and a sub PIP picture on the screen. The twin-picture function constructs two main and sub pictures having the same size, and the main/sub picture state can be toggled through the movement of a cursor.

If the user selects both the main and sub pictures as the analog channels, one data path is formed in the order of the RF switching section 31, the NTSC tuning section 32, and the video processing section 44, while the other data path is formed in the order of the RF switching section 31, the ATSC tuning section 33, the IF switching section 34, the NTSC SAW filter 35, and the NTSC IF demodulating section 38.

Meanwhile, if the user selects both the main and sub pictures as the digital channel and the analog channel, respectively, one data path is formed in the order of the RF switching section 31, the NTSC tuning section 32, and the video processing section 44, while the other data path is formed in the order of the RF switching section 31, the ATSC tuning section 33, the IF switching section 34, the ATSC SAW filter 36, the ATSC IF demodulating section 39, and the VSB decoder 40. If the user selects both the main and sub pictures as the analog channel and the digital channel, respectively, the data paths are formed in the same manner as above. The CPU 41 controls the data paths.

The CPU 41 controls the gains of the RF and IF signals of the NTSC tuning section 32, and the gains of the RF and IF signals of the ATSC tuning section 33. At this time, the gain of the ATSC tuning section 33 is differently controlled by the CPU 41 through the AGC switching section 42 according to the present selected channel, i.e., whether the present selected channel is the analog channel or the digital channel, and according to the gain of the RF signal detected by the NTSC IF demodulating section 38 and the VSB decoder 40.

First, if the user selects both the main and sub pictures as the analog channels, two analog channels for the main and sub pictures are selected by the NTSC tuning section 32 and the ATSC tuning section 33, respectively, under the control of the CPU 41.

The NTSC tuning section 32 converts the selected NTSC RF signal into the NTSC IF signal, demodulates the converted NTSC IF signal into the video and audio signals, and then outputs the video signal to the video processing section 44 and the audio signal to the audio processing section 43.

The ATSC tuning section 33 converts the selected NTSC RF signal into the NTSC IF signal, and outputs the NTSC IF signal to the IF switching section 34. At this time, the IF switching section 34 is switched under the control of the CPU 41, and selectively outputs the NTSC IF signal to the NTSC SAW filter 35.

FIG. 3 is a detailed circuit diagram illustrating the construction of the IF switching section 34. Under the control of the CPU 41, the IF switching section 33 outputs the IF signal demodulated by the ATSC tuning section 33 selectively to the NTSC SAW filter 35 or the ATSC SAW filter 36. In the embodiment of the present invention, it is assumed that the CPU 41 outputs '1' as the IF control signal IF CTL if the selected channel is the analog channel, and outputs '0' if the selected channel is the digital channel.

Specifically, since it is assumed that the analog channel is selected by the ATSC tuning section 33, the IF switching section 34 receives the IF control signal IF CTL having the value of '1' through the CPU 41.

The IF control signal is inputted to the bases of the transistors Q1 and Q2 in FIG. 3, and the IF signal outputted from the ATSC tuning section 33 is inputted to capacitors C1 and C2.

Then, the transistor Q2 is turned on, and the IF signal having passed the capacitor C2 passes through the diode D2, is AC-coupled through a capacitor C3, and then is outputted to the NTSC SAW filter 35. At this time, though the transistor Q1 is simultaneously turned on, the IF signal having passed through the capacitor C1 cannot be outputted to the following ATSC SAW filter 36, but is intercepted. In FIG. 3, resistors not explained are for the bias and voltage dividing, and capacitors are for the AC coupling.

The NTSC SAW filter 35 converts the NTSC IF signal outputted through the IF switching section 34 into a band that matches the selected analog channel, and outputs the converted IF signal to the NTSC IF demodulating section 38 to reproduce the video and audio signals. That is, since all information exists within the band from the IF frequency to 6 MHz of the NTSC video signal, the NTSC SAW filter 35 performs filtering of the output of the IF switching section 34 so that only the band of 6 MHz where the information exists passes through the filter, but all other band signals are removed by the filter, and outputs the filtered band signal to the NTSC IF demodulating section 38. In other words, the NTSC SAW filter 35 removes adjacent channel signals and noise signals.

The video signal from the NTSC IF demodulating section 38 is outputted to the video processing section 44, and the audio signal is outputted to the audio processing section 43.

The video processing section 44 processes the NTSC IF video signal outputted from the NTSC tuning section 32 and the video signal outputted from the NTSC IF demodulating section 38 so that they match the main-picture and sub-picture display, and outputs the processed video signals to the display section 47 through the mixer 45.

The NTSC IF demodulating section 38 detects the gain of the received NTSC video signal, and outputs the gain to the AGC switching section 42. The AGC switching section 42 is switched under the control of the CPU 41, and adjusts the RF gain of the ATSC tuning section 33 according to the detected RF gain, resulting in that a uniform gain of the NTSC video signal can be obtained.

Meanwhile, if the user selects both the main and sub pictures as the analog channel and the digital channel, respectively, the analog channel for the main picture is selected by the NTSC tuning section 32, and the digital channel for the sub picture is selected by the ATSC tuning section 33, under the control of the CPU 41.

The NTSC RF signal selected by the NTSC tuning section 32 is processed as described above, and the processed audio and video signals are outputted to the audio processing section 43 and the video processing section 44.

The ATSC tuning section 33 converts the selected ATSC RF signal into an ATSC IF signal, and outputs the ATSC IF signal to the IF switching section 34. The IF switching section 34 is switched under the control of the CPU 41, and selectively outputs the ATSC IF signal to the ATSC SAW filter 36.

At this time, since it is assumed that the digital channel is selected by the ATSC tuning section 33, the IF switching section 34 receives the IF control signal IF CTL having the value of '0' through the CPU 41.

The IF control signal is inputted to the bases of the transistors Q1 and Q2 in FIG. 3, and the IF signal from the ATSC tuning section 33 is inputted to the capacitors C1 and C2.

Then, the transistors Q1 and Q2 are simultaneously turned on. At this time, the collector of the transistor Q1 is in a high state by the bias resistor R1, and as the diode D1 is turned on, the IF signal having passed through the capacitor C1 is outputted to the ATSC SAW filter 36. Though the transistor Q2 is simultaneously turned off and the collector thereof is in a high state by the bias resistor R2, the IF signal having passed through the capacitor C2 cannot be outputted to the following NTSC SAW filter 37, but is intercepted due to a reverse operation condition of the diode D2.

The ATSC SAW filter 36 converts the ATSC IF signal outputted through the IF switching section 34 into a band that matches the selected digital channel, and outputs the converted IF signal to the ATSC IF demodulating section 39 to converts the ATSC IF signal into a bit stream. For example, since all information exists within the band from the IF frequency to 6 MHz of the ATSC video signal, the ATSC SAW filter 36 performs filtering of the output of the IF switching section 34 so that only the band of 6 MHz where the information exists passes through the filter, but all other band signals are removed by the filter, and outputs the filtered band signal to the ATSC IF demodulating section 39. In the same manner as the NTSC SAW filter 35, the ATSC SAW filter 36 removes adjacent channel signals and noise signals.

At this time, the output of the ATSC SAW filter 36 is inputted to and amplified to a proper level by the amplifier 37, and then outputted again to the ATSC SAW filter 36. This is for reducing at maximum the interference among the adjacent channels of the ATSC signal.

The ATSC IF demodulating section 39 converts the SAW-filtered signal into a digital signal, demodulates the digital signal into a baseband signal, and then outputs the demodulated signal to the VSB decoder 40 in the form of a bit stream.

The VSB decoder 40 restores the original video signal from the compressed video signal by performing a variable-length decoding, inverse quantization, inverse discrete cosine transform, and motion compensation with respect to the inputted bit stream, and outputs the restored video signal to the mixer 45. Simultaneously, the VSB decoder 40 detects the RF AGC signal, and outputs the detected RF AGC signal to the AGC switching section 42. The AGC switching section 42 is switched under the control of the CPU 41, and adjusts the RF gain of the ATSC tuning section according to the detected RF gain, resulting in that a uniform gain of the ATSC video signal can be obtained.

The mixer 45 mixes the analog video signal for the main picture outputted from the video processing section 44 with the digital video signal for the sub picture outputted from the VSB decoder 40, and outputs a mixed video signal to the display section 47.

AT this time, if it is assumed that the user selects both the main and sub pictures as the digital channel and the analog channel, respectively, the data paths are formed in the same manner as described above, but the analog channel for the sub picture is selected by the NTSC tuning section 32, while the digital channel for the main picture is selected by the ATSC tuning section 33. The following process is the same as described above, the detailed explanation thereof will be omitted.

Also, if the user selects only the main picture as the digital channel, the digital channel for the main picture is selected by the ATSC tuning section 33 under the control of the CPU 41, and the selected digital video signal is outputted to the ATSC SAW filter 36 through the IF switching section 34.

Meanwhile, if the user selects only the main picture as the analog channel, the analog channel for the main picture is selected by the NTSC tuning section 32 or the ATSC tuning section 33 under the control of the CPU 41. If the analog channel is selected by the ATSC tuning section 33, the IF signal of the selected analog channel is outputted to the NTSC SAW filter 35 through the IF switching section 34.

As described above, according to the digital TV of the present invention, the analog or digital broadcasting signal is selected and displayed using only two tuners irrespective of the main or sub picture, and thus the manufacturing cost can be reduced with the improvement of the product competitiveness.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital television receiver comprising:
   a control section for generating and outputting control signals according to a user's command for selecting a channel and a main/sub picture;
   an analog tuning section for selecting an RF signal of an analog channel selected by the user among RF signals received through an antenna under the control of the control section, and converting the selected RF signal into an IF signal;
   an analog/digital (A/D)-combined tuning section for selecting an RF signal of an analog or digital channel selected by the user among the RF signals received through the antenna under the control of the control section;

a first analog video processing section for processing the IF signal of the analog channel selected by the analog tuning section in accordance with the main or sub picture selected by the user;

a second analog video processing section for processing the IF signal of the analog channel selected by the A/D-combined tuning section in accordance with the main or sub picture selected by the user;

a digital video processing section for processing the IF signal of the digital channel selected by the A/D-combined tuning section in accordance with the main or sub picture selected by the user; and an IF switching section for being switched under the control of the control section, and selectively outputting the IF signal outputted from the A/D-combined tuning section to either the second analog video processing section or the digital video processing section.

2. The digital television receiver as claimed in claim 1, wherein the second analog video processing section comprises:

an analog SAW filter for filtering a desired analog channel band from the IF signal outputted through the IF switching section;

an analog IF demodulating section for demodulating the IF signal outputted from the analog SAW filter, and separating the demodulated IF signal into video and audio signals; and a video processing section for processing the video signal in accordance with the main or sub picture selected by the user, and synthesizing the processed video signal with an output of the first analog video processing section to output a synthesized video signal.

3. The digital television receiver as claimed in claim 1, wherein the digital video processing section comprises:

a digital SAW filter for filtering a desired digital channel band from the IF signal outputted through the IF switching section;

a digital IF demodulating section for demodulating the IF signal outputted from the digital SAW filter, and outputting a demodulated signal in the form of a bit stream; and a digital decoder for restoring the original video signal by decoding the bit stream in a reverse order to compression.

4. The digital television receiver as claimed in claim 3, wherein the digital decoder restores the original video signal by performing a variable-length decoding, inverse quantization, inverse discrete cosine transform, and motion compensation with respect to the inputted bit stream.

5. The digital television receiver as claimed in claim 1, wherein the IF switching section comprises:

first and second transistors whose collectors are connected together to receive the IF signal outputted from the A/D-combined tuning section, whose emitters are grounded, and whose bases are connected in common to the control section, the first and second transistors being simultaneously turned on/off according to a logic signal outputted from the control section;

a first diode whose anode is connected to the collector of the first transistor, and whose cathode is connected to a digital SAW filter, the first diode being turned on and outputting the IF signal outputted from the A/D-combined tuning section to the digital SAW filter if the first transistor is turned off; and a second diode whose cathode is connected to the collector of the second transistor, and whose anode is connected to an analog SAW filter, the second diode being turned on and outputting the IF signal outputted from the A/D-combined tuning section to the analog SAW filter if the second transistor is turned on.

6. The digital television receiver as claimed in claim 1, wherein if the user selects both the main picture and the sub picture as the analog channels, the analog tuning section selects the RF signal of the analog channel for the main picture and converts the selected RF signal into the IF signal, the A/D-combined tuning section selects the RF signal of the analog channel for the sub picture and converts the selected RF signal into the IF signal, and the IF switching section selectively outputs the IF signal of the analog channel for the sub picture selected by the A/D combined tuning section to the second analog video processing section under the control of the control section.

7. The digital television receiver as claimed in claim 1, wherein if the user selects both the main picture and the sub picture as the analog channels, the A/D-combined tuning section selects the RF signal of the analog channel for the main picture and converts the selected RF signal into the IF signal, the analog tuning section selects the RF signal of the analog channel for the sub picture and converts the selected RF signal into the IF signal, and the IF switching section selectively outputs the IF signal of the analog channel for the main picture selected by the A/D combined tuning section to the second analog video processing section under the control of the control section.

8. The digital television receiver as claimed in claim 1, wherein if the user selects the main picture and the sub picture as the analog channel and the digital channel, respectively, the analog tuning section selects the RF signal of the analog channel for the main picture and converts the selected RF signal into the IF signal, the A/D-combined tuning section selects the RF signal of the digital channel for the sub picture and converts the selected RF signal into the IF signal, and the IF switching section selectively outputs the IF signal of the digital channel for the sub picture selected by the A/D combined tuning section to the digital video processing section under the control of the control section.

9. The digital television receiver as claimed in claim 1, wherein if the user selects the main picture and the sub picture as the digital channel and the analog channel, respectively, the A/D-combined tuning section selects the RF signal of the digital channel for the main picture and converts the selected RF signal into the IF signal, the analog tuning section selects the RF signal of the analog channel for the sub picture and converts the selected RF signal into the IF signal, and the IF switching section selectively outputs the IF signal of the digital channel for the main picture selected by the A/D combined tuning section to the digital video processing section under the control of the control section.

10. The digital television receiver as claimed in claim 1, wherein if the user selects only the main picture as the analog channel, the analog tuning section selects the RF signal of the analog channel for the main picture and converts the selected RF signal into the IF signal under the control of the control section.

11. The digital television receiver as claimed in claim 1, wherein if the user selects only the main picture as the analog channel, the A/D-combined tuning section selects the RF signal of the analog channel for the main picture and converts the selected RF signal into the IF signal, and the IF switching section selectively outputs the IF signal of the analog channel for the main picture selected by the A/D combined tuning section to the second analog video processing section under the control of the control section.

12. The digital television receiver as claimed in claim 1, wherein if the user selects only the main picture as the digital channel, the A/D-combined tuning section selects the RF signal of the digital channel for the main picture and converts the selected RF signal into the IF signal, and the IF switching section selectively outputs the IF signal of the digital channel for the main picture selected by the A/D combined tuning section to the digital video processing section under the control of the control section.

13. The digital television receiver as claimed in claim 1, further comprising an AGC switching section for detecting gains from outputs of the second analog video processing section and the digital video processing section, respectively, being switched under the control of the control section, and controls a gain of the signal selected by the A/D-combined tuning section.

14. The digital television receiver as claimed in claim 1, further comprising an amplifier for amplifying an output of a digital SAW filter to a predetermined level, and feeding its output back to the digital SAW filter.

15. A digital television receiver comprising:
   a control section for generating and outputting control signals according to a user's command for selecting a channel and a main/sub picture;
   an analog tuning section for selecting an RF signal of an analog channel selected by the user among RF signals received through an antenna under the control of the control section, and converting the selected RF signal into an IF signal;
   an analog/digital (A/D)-combined tuning section for selecting an RF signal of an analog or digital channel selected by the user among the RF signals received through the antenna under the control of the control section;
   a first analog video processing section for processing the IF signal of the analog channel selected by the analog tuning section in accordance with the main or sub picture selected by the user;
   a second analog video processing section for processing the IF signal of the analog channel selected by the A/D-combined tuning section in accordance with the main or sub picture selected by the user;
   a digital video processing section for processing the IF signal of the digital channel selected by the A/D-combined tuning section in accordance with the main or sub picture selected by the user;
   an IF switching section for being switched under the control of the control section, and selectively outputting the IF signal outputted from the A/D-combined tuning section to either the second analog video processing section or the digital video processing section;
   an AGC switching section for detecting respective gains from the outputs of the second analog video processing section and the digital video processing section, being switched under the control of the control section, and controlling a gain of the signal selected by the A/D-combined tuning section; and
   a mixer for mixing the outputs of the first and second analog video processing sections and the output of the digital video processing section, and outputting a mixed signal for display.

16. The digital television receiver as claimed in claim 15, further comprising an amplifier for amplifying an output of a digital SAW filter to a predetermined level, and feeding its output back to the digital SAW filter.

17. The digital television receiver as claimed in claim 15, wherein the IF switching section comprises:
   first and second transistors whose collectors are connected together to receive the IF signal outputted from the A/D-combined tuning section, whose emitters are grounded, and whose bases are connected in common to the control section, the first and second transistors being simultaneously turned on/off according to a logic signal outputted from the control section;
   a first diode whose anode is connected to the collector of the first transistor, and whose cathode is connected to a digital SAW filter, the first diode being turned on and outputting the IF signal outputted from the A/D-combined tuning section to the digital SAW filter if the first transistor is turned off; and
   a second diode whose cathode is connected to the collector of the second transistor, and whose anode is connected to an analog SAW filter, the second diode being turned on and outputting the IF signal outputted from the A/D-combined tuning section to the analog SAW filter if the second transistor is turned on.

18. The digital television receiver as claimed in claim 15, wherein if the user selects both the main picture and the sub picture as the analog channels, the analog tuning section selects the RF signal of the first analog channel selected by the user and converts the selected RF signal into the IF signal, the A/D-combined tuning section selects the RF signal of the second analog channel selected by the user and converts the selected RF signal into the IF signal, and the IF switching section selectively outputs the IF signal of the second analog channel selected by the A/D combined tuning section to the second analog video processing section under the control of the control section.

19. The digital television receiver as claimed in claim 1, wherein if the user selects the main picture and the sub picture as the analog channel and the digital channel, respectively, the analog tuning section selects the RF signal of the analog channel selected by the user and converts the selected RF signal into the IF signal, the A/D-combined tuning section selects the RF signal of the digital channel selected by the user and converts the selected RF signal into the IF signal, and the IF switching section selectively outputs the IF signal of the digital channel selected by the A/D combined tuning section to the digital video processing section under the control of the control section.

* * * * *